United States Patent
Zhao et al.

(10) Patent No.: US 10,187,717 B2
(45) Date of Patent: Jan. 22, 2019

(54) TERMINAL DEVICE

(71) Applicant: HUAWEI TECHNOLOGIES CO., LTD., Guangdong (CN)

(72) Inventors: Menglong Zhao, Shenzhen (CN); Bin Zhang, Shenzhen (CN); Guangsheng Liu, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/319,342

(22) PCT Filed: Jun. 25, 2014

(86) PCT No.: PCT/CN2014/080708
§ 371 (c)(1),
(2) Date: Dec. 15, 2016

(87) PCT Pub. No.: WO2016/015179
PCT Pub. Date: Feb. 4, 2016

(65) Prior Publication Data
US 2017/0134843 A1    May 11, 2017

(51) Int. Cl.
*H04R 1/10* (2006.01)
*H04M 1/05* (2006.01)
(Continued)

(52) U.S. Cl.
CPC ............. *H04R 1/105* (2013.01); *G06F 21/35* (2013.01); *H04B 1/385* (2013.01); *H04M 1/05* (2013.01);
(Continued)

(58) Field of Classification Search
CPC ... H04R 1/105; H04R 1/1066; H04R 2225/63
See application file for complete search history.

(56) References Cited

U.S. PATENT DOCUMENTS 5,881,149 A * 3/1999 Weatherill ............. H04M 1/05
                                                      379/430
6,035,961 A * 3/2000 Sun ....................... H04R 1/1058
                                                      181/126
(Continued)

FOREIGN PATENT DOCUMENTS

CA        2844523 A1    3/2012
CN        2800681 Y     7/2006
(Continued)

OTHER PUBLICATIONS

PCT/CN2014/080708, International Search Report, dated Mar. 30, 2015, 4 pages.

*Primary Examiner* — Matthew Eason
*Assistant Examiner* — Ryan Robinson
(74) *Attorney, Agent, or Firm* — Womble Bond Dickinson (US) LLP

(57) ABSTRACT

A terminal device, including a band and a headset, where the band includes a U-shaped band main body, and a first band end portion and a second band end portion that are separately located at two ends of the band main body; the headset includes a headset main body, and the headset main body includes a first headset end portion and a second headset end portion; the first band end portion is fixedly connected to the first headset end portion by using a rotation structure; when the headset is used, the second headset end portion rotates by using the rotation structure as a sphere center; when the headset is used, the band is used as an ear hook; and when the headset is not used, the headset and the band together form a closed ring.

4 Claims, 5 Drawing Sheets

(51) Int. Cl.
*H04B 1/3827* (2015.01)
*G06F 21/35* (2013.01)

(52) U.S. Cl.
CPC . *G06F 2221/2153* (2013.01); *H04M 2250/02* (2013.01); *H04R 1/1091* (2013.01); *H04R 2201/107* (2013.01)

(56) References Cited

U.S. PATENT DOCUMENTS

| | | | | |
|---|---|---|---|---|
| 6,529,713 | B1* | 3/2003 | Seymour | H04M 1/0254 368/13 |
| 6,637,910 | B1* | 10/2003 | Mehler | F21L 4/00 181/141 |
| 6,801,476 | B2* | 10/2004 | Gilmour | H04B 1/385 368/10 |
| 8,121,334 | B2* | 2/2012 | Tsai | H04M 1/05 381/374 |
| 8,498,679 | B2* | 7/2013 | Yu | H04M 1/0258 379/430 |
| 9,265,310 | B2* | 2/2016 | Lam | H04W 84/18 |
| 9,392,352 | B2* | 7/2016 | Broadfoot | H04R 1/105 |
| 9,615,161 | B2* | 4/2017 | Baek | G06F 1/163 |
| 2002/0090099 | A1* | 7/2002 | Hwang | H04M 1/05 381/312 |
| 2004/0066948 | A1 | 4/2004 | Bogeskov-Jensen | |
| 2006/0135223 | A1 | 6/2006 | Kim | |
| 2008/0161023 | A1* | 7/2008 | Ko | A44C 15/0015 455/462 |
| 2009/0116678 | A1* | 5/2009 | Bevirt | C22F 1/006 381/381 |
| 2013/0010997 | A1 | 1/2013 | Tanaka et al. | |
| 2013/0243236 | A1 | 9/2013 | Chamness et al. | |
| 2014/0116085 | A1 | 5/2014 | Lam | |
| 2016/0241942 | A1 | 8/2016 | Hsieh et al. | |

FOREIGN PATENT DOCUMENTS

| | | |
|---|---|---|
| CN | 101247667 A | 8/2008 |
| CN | 201557227 U | 8/2010 |
| CN | 202014357 U | 10/2011 |
| CN | 202435582 U | 9/2012 |
| CN | 202587325 U | 12/2012 |
| CN | 202750212 U | 2/2013 |
| CN | 302542743 S | 8/2013 |
| CN | 103815628 A | 5/2014 |
| CN | 203590223 U | 5/2014 |
| EP | 2731350 A1 | 5/2014 |
| JP | 2005191766 A | 7/2005 |
| JP | 2013013540 A | 1/2013 |

* cited by examiner

TERMINAL DEVICE

CROSS-REFERENCE TO RELATED APPLICATION

This patent application is a U.S. National Phase Application under 35 U.S.C. § 371 of International Application No. PCT/CN2014/080708, filed Jun. 25, 2014, entitled TERMINAL DEVICE, which is incorporated by reference herein by its entirety.

TECHNICAL FIELD

Embodiments of the present invention relate to mechanical technologies, and in particular, to a terminal device.

BACKGROUND

With rapid development of science and technology, various terminal devices come into being, such as bands and headsets. Particularly, with the advent of wireless headsets, headsets and receivers become wireless, which relieves people from headset cables. A band is a wearable device and has a decorative function.

Conventional terminal devices, such as a headset and a band, are all self-existent components. When a user does not need to use a headset, the user needs to put the headset away. When needing to use the headset urgently, the user needs to rummage for the headset, which affects the user in using the headset and user experience. Besides, with popularization of terminal devices, users carry more terminal devices. Various self-existent terminal devices occupy relatively large space, making it inconvenient to carry terminal devices.

SUMMARY

Embodiments of the present invention provide a terminal device, to reduce space occupied by the terminal device and make it convenient for a user to carry the terminal device.

An embodiment of the present invention provide a terminal device, including:

a band, where the band includes a U-shaped band main body, and a first band end portion and a second band end portion that are located at two ends of the band main body; and a headset, where the headset includes a headset main body, and the headset main body includes a first headset end portion and a second headset end portion, where the first band end portion is fixedly connected to the first headset end portion by using a rotation structure;

when the headset is used, the second headset end portion rotates by using the rotation structure as a sphere center; and when the headset is used, the band is used as an ear hook; and when the headset is not used, the headset and the band together form a closed ring.

In the foregoing terminal device, the headset further includes a headset receiver, a groove is arranged at a position, close to the second headset end portion, on a bottom surface of the headset main body, one end of the headset receiver is movably connected to a fixed pole within the groove, and the other end of the headset receiver is arranged in a suspended manner.

In the foregoing terminal device, when the headset is not used, the headset receiver is accommodated within the groove, and the second headset end portion is in contact with the second band end portion.

In the foregoing terminal device, when the headset is not used, the headset receiver is arranged outside the groove, and the other end of the headset receiver is in contact with the second band end portion.

In the foregoing terminal device, the rotation structure is a spherical magnet or a spindle.

In the foregoing terminal device, a material of the band main body is a deformable material or a non-deformable material.

In the terminal device provided in the present invention, a first band end portion of a band main body is fixedly connected to a first headset end portion of a headset main body by using a rotation structure, so that a second headset end portion rotates by using the rotation structure as a sphere center; when a headset is used, a band is used as an ear hook; and when the headset is not used, the headset and the band together form a closed ring for a user to wear, so as to reduce space occupied by the terminal device and make it convenient for the user to carry the terminal device.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
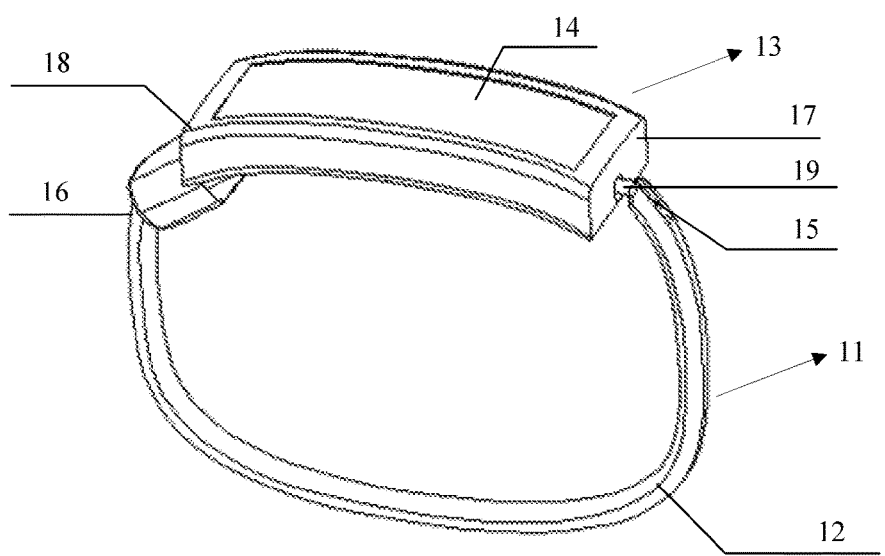
FIG. 1 is a schematic structural diagram when a headset in a terminal device is not used according to Embodiment 1 of the present invention.
Figure 2:
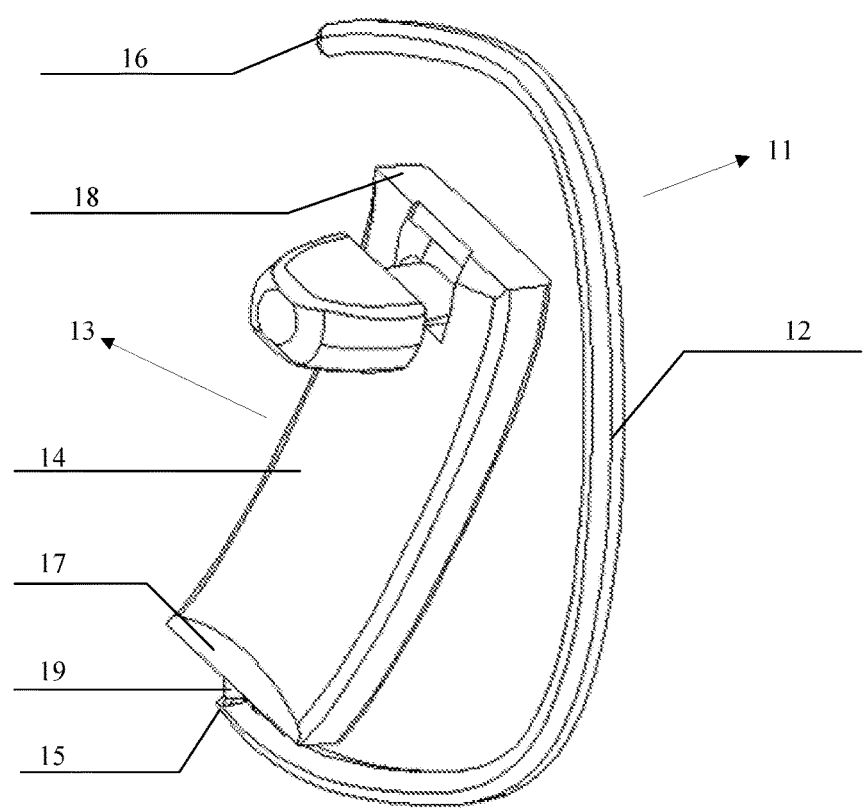
FIG. 2 is a left view when the headset in the terminal device is used according to Embodiment 1 of the present invention.
Figure 3:
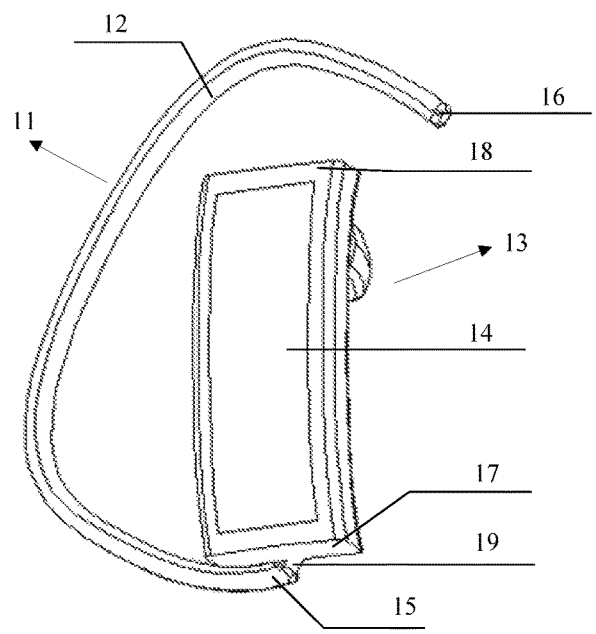
FIG. 3 is a right view when the headset in the terminal device is used according to Embodiment 1 of the present invention.

FIG. 1 is a schematic structural diagram when a headset in a terminal device is not used according to Embodiment 1 of the present invention; FIG. 2 is a left view when the headset in the terminal device is used according to Embodiment 1 of the present invention; and FIG. 3 is a right view when the headset in the terminal device is used according to Embodiment 1 of the present invention. As shown in FIG. 1, the terminal device of this embodiment of the present invention includes a band 11 and a headset 13, where the band 11 is a device having a decorative function and an electronic function. The band 11 may be a ring-shaped ornament having a decorative function and worn on a wrist part, or a smart band having an electronic function and capable of detecting human health conditions such as a pulse, or may be a smart band implementing a wireless synchronous connection to a smart phone and having a phone answering function, which is not limited in the present invention. The band 11 includes a U-shaped band main body 12, and a first band end portion 15 and a second band end portion 16 that are separately located at two ends of the U-shaped body, and a user may wear the band 11 on a wrist by using a U-shaped notch of the band main body. The headset 13 includes a headset main body 14, where the headset main body 14 includes a first headset end portion 17 and a second headset end portion 18, and the first band end portion 15 is fixedly connected to the first headset end portion 17 by using a rotation structure 19. When the headset 13 is not used, the headset 13 and the band 11 together form a closed ring for the user to wear. As shown in FIG. 2 and FIG. 3, when the headset 13 is used, the user rotates the second headset end portion 18 along any axis by using the rotation structure 19 as a sphere center, and may flexibly change relative positions of the headset 13 and the band 11. In this case, the band 11 is used as an ear hook.

Figure 4:
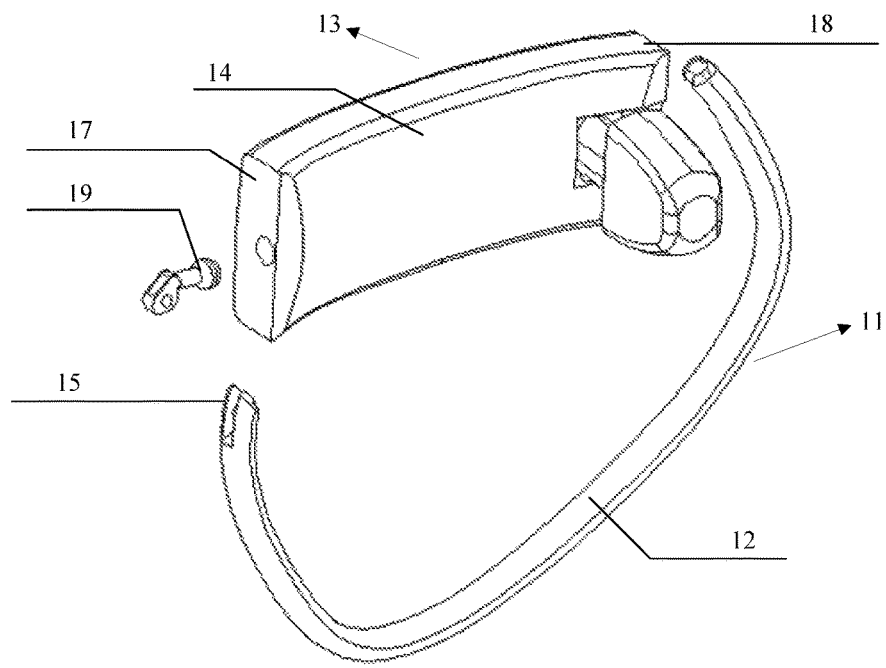
FIG. 4 is a schematic structural diagram in which a rotation structure in the terminal device connects the headset and a band according to Embodiment 1 of the present invention.

FIG. 4 is a schematic structural diagram in which a rotation structure in the terminal device connects the headset and a band according to Embodiment 1 of the present invention. As shown in FIG. 4, the first band end portion 15 of the band 11 is fixedly connected to the first headset end portion 17 of the headset 13 by using a rotation structure 19. When the user needs to use the headset 13, the user rotates the second headset end portion 18 of the headset 13 by using the rotation structure 19 as a sphere center. One end of the rotation structure 19 is fastened to the first band end portion 15 of the band, and the other end of the rotation structure 19 is connected to the first headset end portion 17 of the headset 13 by using a spherical magnet or a spindle. A person skilled in the art can understand that when the user uses the headset 13, the user may rotate the headset 13 along any axis by using the rotation structure 19 as a sphere center and may flexibly change the relative positions of the headset 13 and the band 11, to improve a comfort degree when the user uses the headset.

Figure 5:
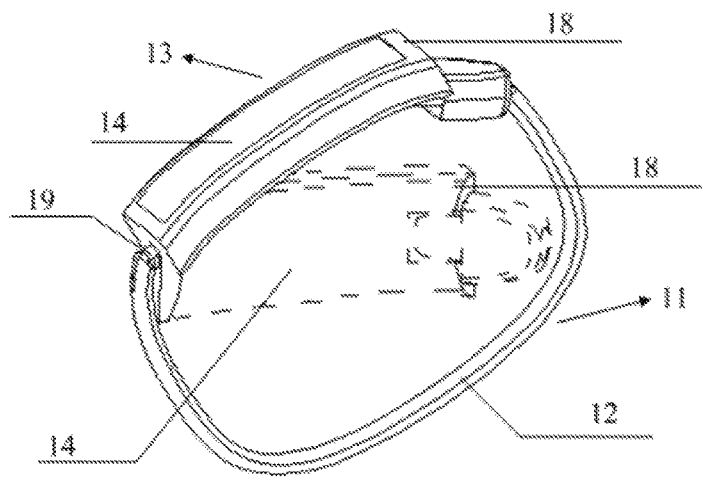
FIG. 5 is a schematic diagram from a moment when the headset in the terminal device is not used to a moment when the headset is used according to Embodiment 1 of the present invention.

FIG. 5 is a schematic diagram from a moment when the headset in the terminal device is not used to a moment when the headset is used according to Embodiment 1 of the present invention. As shown in FIG. 5, when the user needs to use the headset 13, the user may rotate the second headset end portion 18 of the headset by using the rotation structure 19 as a sphere center. When the terminal device is used as a headset, the user hangs the band 11 on an ear and uses the band 11 as an ear hook, so that the headset can be fastened in a better way. When the user does not need to use the headset 13, the headset 13 and the band 11 may together form a closed ring for the user to wear, thereby implementing free conversion between the headset and the band, effectively utilizing existing space to accommodate the headset, and making it relatively convenient for the user to carry the headset.

In the terminal device provided in this embodiment, a first band end portion of a band main body is fixedly connected to a first headset end portion of a headset main body by using a rotation structure, so that a second headset end portion rotates by using the rotation structure as a sphere center. When a headset is used, a band is used as an ear hook; when the headset is not used, the headset and the band together form a closed ring for a user to wear, so as to reduce space occupied by the terminal device and make it convenient for the user to carry the terminal device.

Figure 6:
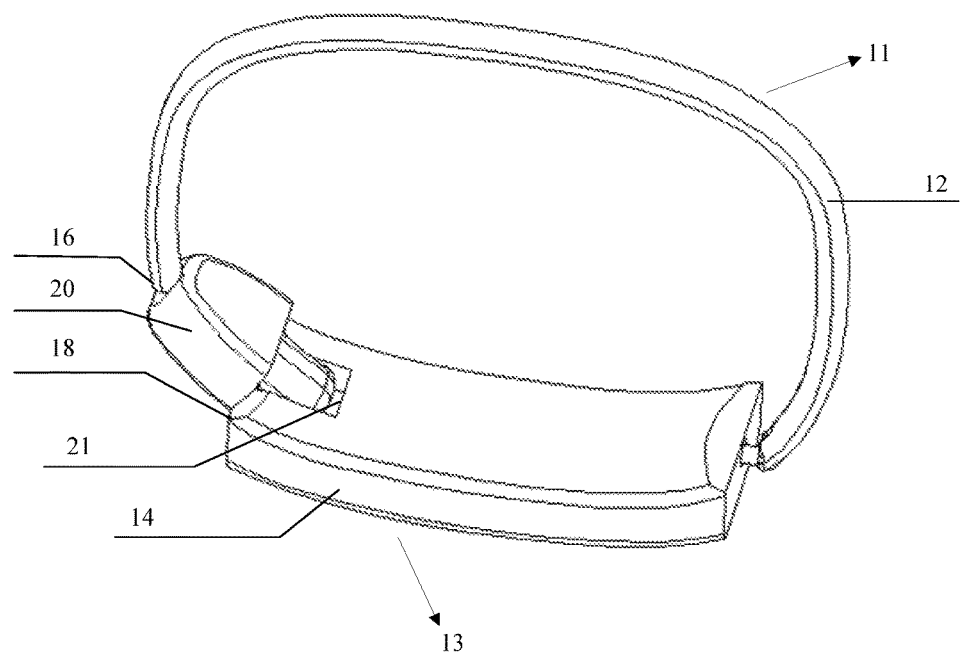
FIG. 6 is a schematic structural diagram of a terminal device according to Embodiment 2 of the present invention.
Figure 7:
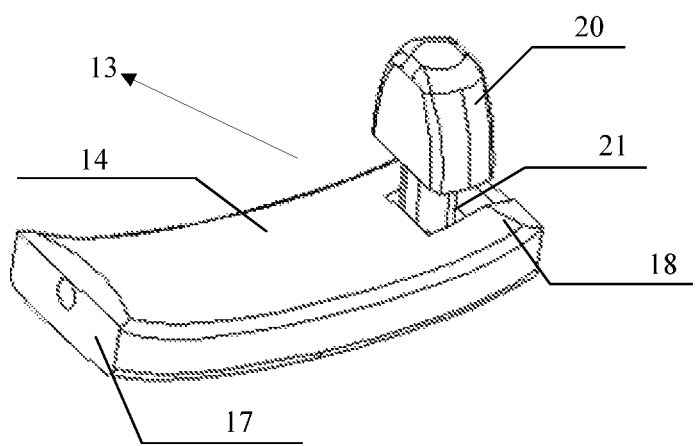
FIG. 7 is a schematic structural diagram of a headset when the headset in the terminal device is used according to Embodiment 2 of the present invention.

FIG. 6 is a schematic structural diagram of a terminal device according to Embodiment 2 of the present invention; and FIG. 7 is a schematic structural diagram of a headset when the headset in the terminal device is used according to Embodiment 2 of the present invention. In this embodiment, based on the terminal device provided in Embodiment 1, a groove is arranged at a bottom surface of a head main body. As shown in FIG. 7, a headset 13 further includes a headset receiver 20, a groove 21 is arranged at a position, close to a second headset end portion 18, on the bottom surface of the headset main body 14, one end of the headset receiver 20 is movably connected to a fixed pole within the groove 21, and the other end of the headset receiver 20 is arranged in a suspended manner. As shown in FIG. 6, when a user does not need to use the headset 13, the user rotates the headset receiver 20 by using the fixed pole within the groove 21 as a circle center until the end, arranged in a suspended manner, of the headset receiver 20 is in contact with a second band end portion 16 of a band 11, which can effectively protect the headset receiver from damage and improve a service life of the headset. In this case, the headset 13 and the band 11 together form a closed ring for the user to wear.

In the terminal device provided in this embodiment, a groove used to accommodate a headset receiver is arranged at a position, close to a second headset end portion, on a bottom surface of a headset main body, which can effectively protect the headset receiver from damage and improve a service life of a headset. In addition, when the headset is not used, the headset receiver is rotated by using the fixed pole within the groove as a circle center until one end, arranged in a suspended manner, of the headset receiver is in contact with a second band end portion of a band, so that the headset and the band together form a closed ring for a user to wear, to reduce space occupied by the terminal device and make it convenient for the user to carry the terminal device.

Optionally, in the foregoing terminal device, when the headset 13 is not used, the headset receiver 20 is rotated into the groove 21 by using the fixed pole within the groove 21 as a circle center, so that the second headset end portion 18 of the headset 13 is in contact with the second band end portion 16 of the band 11, which can effectively protect the headset receiver 20 from damage and improve the service life of the headset. In this case, the headset 13 and the band 11 together form a closed ring for the user to wear.

Optionally, a material of the band main body is a deformable material or a non-deformable material, such as leather or metal, which is not limited in the present invention.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A terminal device, comprising:
   a band, wherein the band comprises a U-shaped band main body, and a first band end portion and a second band end portion that are located at two ends of the band main body; and
   a headset, wherein the headset comprises a headset main body, and the headset main body comprises a first headset end portion and a second headset end portion,
   wherein the first band end portion is fixedly connected to the first headset end portion by using a rotation structure, which is a sphere structure;
   when the headset is used, the second headset end portion rotates by using the rotation structure as a sphere center; and when the headset is used, the band is used as an ear hook; and
   when the headset is not used, the headset and the band together form a closed ring;
   the headset further comprises a headset receiver and a groove, wherein the groove is arranged at a position close to the second headset end portion on a bottom surface of the headset main body, wherein a first end of the headset receiver is movably connected to a fixed pole within the groove, and wherein a second end of the headset receiver is arranged in a suspended manner; and
   when the headset is not used, the headset receiver is arranged outside of the groove, and the second end of the headset receiver is in contact with the second band end portion.

2. The terminal device according to claim 1, wherein when the headset is not used, the headset receiver is accommodated within the groove, and the second headset end portion is in contact with the second band end portion.

3. The terminal device according to claim 1, wherein the rotation structure comprises a spherical magnet or a spindle.

4. The terminal device according to claim 1, wherein the band main body is made of a deformable material or a non-deformable material.

* * * * *